United States Patent
Kwak et al.

(10) Patent No.: US 7,921,295 B2
(45) Date of Patent: Apr. 5, 2011

(54) SERVICE MOBILITY MANAGEMENT SYSTEM USING XML SECURITY AND THE METHOD THEREOF

(75) Inventors: Kyungsup Kwak, Incheon (KR); TaeKyung Sung, Incheon (KR); Sangkyoon Nam, Incheon (KR)

(73) Assignee: Inha-Industry Partnership Institute, Inchon (KR)

( * ) Notice: Subject to any disclaimer, the term of this patent is extended or adjusted under 35 U.S.C. 154(b) by 737 days.

(21) Appl. No.: 11/967,282

(22) Filed: Dec. 31, 2007

(65) Prior Publication Data
US 2008/0276093 A1   Nov. 6, 2008

(30) Foreign Application Priority Data

May 2, 2007   (KR) .................. 10-2007-0042552

(51) Int. Cl.
*H04L 9/00* (2006.01)
*H04L 9/32* (2006.01)
*G06F 7/04* (2006.01)
(52) U.S. Cl. ........ 713/176; 713/155; 713/156; 713/157; 713/175; 713/177; 726/27; 726/28; 726/29; 726/30
(58) Field of Classification Search .................. 713/176
See application file for complete search history.

(56) References Cited

U.S. PATENT DOCUMENTS

2005/0120219 A1* 6/2005 Munetoh et al. .............. 713/176
2006/0140144 A1* 6/2006 Bruner et al. ................. 370/328

OTHER PUBLICATIONS

Kim et al., A MAC-Based Service Bundle Authentication Mechanism in the OSGI Service Platform, DASFAA 2004, LNCS 2973, pp. 137-145, 2004.

* cited by examiner

*Primary Examiner* — Longbit Chai
(74) *Attorney, Agent, or Firm* — Bachman & LaPointe, P.C.

(57) ABSTRACT

A system for managing service mobility using an extensible Markup Language (XML) electronic signature. A mobility interface stops and stores the operation of a service being currently performed. Before the service is moved, a service serializer serializes service state information and converts it into an XML form which is attachable to an electronic signature. An XML security manager creates an XML electronic signature for the Manifest file of the Java ARchive (JAR) file of a service bundle, attaches the serialized service state information to the XML electronic signature, and records it. A service installer transmits the signed JAR file to an Open Service Gateway initiative (OSGi) framework that has requested that the service be moved.

8 Claims, 7 Drawing Sheets

FIG. 2

```
<Signature>
 <SignedInfo>
   <CanonicalizationMethod>
   <SignatureMethod>
   (<Reference (URI=)?>
     (<Transforms>)?
     <DigestMethod>
     <DigestValue>
   </Reference>)+
 </SignedInfo>
 <SignatureValue>
 (<KeyInfo>)?
 (<Object>)*
</Signature>
```

\* Denotes zero or more occurrence
+ Denotes one or more occurrence
? Denotes zero or one occurrence

FIG. 6A

```
<Signature Id="ServiceMobilityManager"
  xmlns="http://www.w3.org/2000/09/xmldsig#">
<SignedInfo>
<CanonicalizationMethod
Algorithm="http://www.w3.org/TR/2001/REC-xml-c14n-20010315"/>
<SignatureMethod
Algorithm="http://www.w3.org/2000/09/xmldsig#dsa-sha1"/>
<Reference URI="http://www.w3.org/TR/2000/REC-
xhml1-20000126/">
<Transforms>
<Transform
Algorithm="http://www.w3.org/TR/2001/REC-xml-c14n-20010315"/>
</Transforms>
<DigestMethod
Algorithm="http://www.w3.org/2000/09/xmldsig#dsa-sha1"/>
<DigestValue>j61wx3rvEPO0vKtMup4NbeVu8nk=
</DigestValue>
</Reference>
</SignedInfo>
<SignatureValue>MC0CFFrVLtRlk=...
</SignatureValue>
<KeyInfo>
<KeyValue>
```

FIG. 6B

```
<DSAKeyValue>
<P>...</P><Q>...</Q><G>...</G><Y>...</Y>
</DSAKeyValue>
</KeyValue>
</KeyInfo>
 <Object>
  <SignatureProperties>
   <SignatureProperty Id="ServiceStateInformation"Target="#ServiceMobilityManager">
    <mplayer>
      <description>mp3 music player</description>
      <status>2</status>
      <option>
         <repeat>false</repeat>
      </option>
      <current>
        <offset>132</offset>
        <id>2</id>
      <item id="1">
        <title>pop1</title>
        <location>music/dance1.mp3</location>
      </item>
    </mplayer>
   </SignatureProperty>
  </SignatureProperties>
 </Object>
</Signature>
```

SERVICE MOBILITY MANAGEMENT SYSTEM USING XML SECURITY AND THE METHOD THEREOF

BACKGROUND OF THE INVENTION

The present invention relates generally to a system and method for managing service mobility between service gateways, in each of which an Open Service Gateway initiative (OSGi) service platform is installed, using an Extensible Markup Language (XML) electronic signature, and, more particularly, to a system and method for managing service mobility, which creates an XML electronic signature for the Manifest file of the Java ARchive (JAR) file of a service bundle on an OSGi framework, and records service state information in the <Object> element of the XML electronic signature, thereby supporting service mobility.

Generally, existing systems for managing service mobility support service mobility between OSGi frameworks through the transmission of service state information using remote installation and object movement, supported by an OSGi framework. However, this scheme has problems in that a malicious service may be installed or a service may be changed by an unauthenticated framework or an operator on a network during remote installation, and to the scheme cannot support service mobility in real time because the process is complicated.

Further, an OSGi service platform has proposed the basic direction of a security model which recommends that a Public Key Infrastructure (PKI)-based service bundle authentication mechanism and Remote Communication in a Secure way based on HTTP (RSH) protocol be used. Such a security model requires not only public-key operations but also interworking with a certification authority and additional operations in order to verify the validity of public key certificates. Therefore, the security model has problems in that the performance thereof is expected to be deteriorated on an OSGi service platform which has limited system resources for storage space or operations, and the security model is not suitable for a system for managing service mobility that must move services in real time.

SUMMARY OF THE INVENTION

Accordingly, the present invention has been made keeping in mind the above problems occurring in the prior art, and an object of the present invention is to provide a system and method for managing service mobility using an XML electronic signature, which solves the security problem of existing systems for managing service mobility, can simplify a related process and support service mobility in real time between service gateways having limited system resources, without performing additional operations or interworking with a certification authority, and transmits a secured service bundle and service state information, thereby supporting secure and efficient service mobility.

A system for managing service mobility using an eXtensible Markup Language (XML) electronic signature according to the present invention, includes a mobility interface for stopping and storing the operation of a service being currently performed; a service serializer for, before the service is moved, serializing service state information and converting it into an XML form, which is attachable to an electronic signature; an XML security manager for creating an XML electronic signature for the Manifest file of the Java ARchive (JAR) file of a service bundle, attaching the serialized service state information to the XML electronic signature, and recording it; and a service installer for transmitting the signed JAR file to an Open Service Gateway initiative (OSGi) framework that has requested that the service be moved.

Here, an OSGi framework, which received the signed JAR file, installs the service by performing the above-described process in reverse, and sets service state information, thereby supporting the service mobility.

Further, a method of managing service mobility using an XML electronic signature, includes stopping the operation of a service being currently performed, and storing it in a mobility interface; before the service is moved, serializing service state information and converting it into an XML form, which is attachable to an electronic signature; creating an XML electronic signature for the Manifest file of the JAR file of a service bundle, attaching the serialized service state information to the XML electronic signature, and recording it; and transmitting the signed JAR file to an OSGi framework that has requested that the service be moved.

BRIEF DESCRIPTION OF THE DRAWINGS

The above and other objects, features and other advantages of the present invention will be more clearly understood from the following detailed description, taken in conjunction with the accompanying drawings, in which:

FIG. 2 is a view showing source code, which describes the basic configuration of an XML electronic signature;

FIGS. 6A and 6B is a view showing source code which shows an example of transfer according to the service mobility of a music playback program in the system for managing service mobility using an XML electronic signature on an OSGi service platform according to the present invention.

DESCRIPTION OF THE PREFERRED EMBODIMENTS

Figure 1:
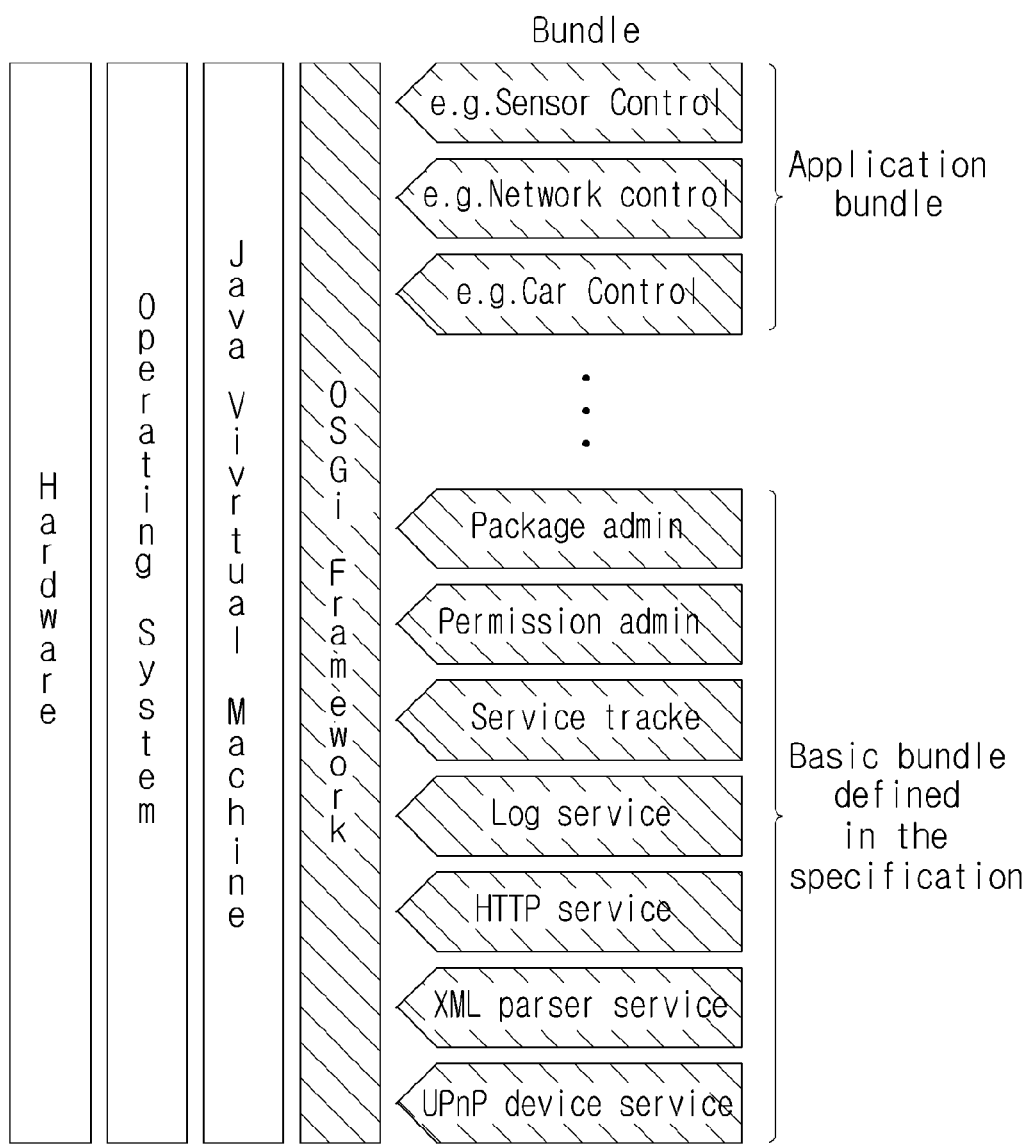
FIG. 1 is a block diagram showing the configuration of an OSGi platform.

Hereinafter, embodiments of the present invention will be described in detail with reference to the attached drawings. First, reference now should be made to the drawings, in which the same reference numerals are used throughout the different drawings to designate the same elements or components. It should be noted that, in the following description, a detailed description of well-known functions related to the present invention and the construction thereof will be omitted in order to prevent the gist of the present invention from being obscure.

FIG. 1 is a block diagram showing the entire configuration of an OSGi framework realized on a service gateway according to the present invention.

As shown in FIG. 1, an OSGi framework operates on a Java virtual machine, so that the OSGi framework independently operates regardless of the operating system and hardware, which are arranged under the Java virtual machine.

Bundles on the OSGi framework indicate service packages directly developed by a user. Therefore, if the bundles comply with the OSGi framework specification, interoperability can be realized regardless of the implementation methods thereof, so that different types of home network devices can communicate with each other.

FIG. 2 is a view showing source code which describes the configuration of an XML electronic signature created to record the security information of a bundle and service state when a service is moved in the present invention.

As shown in FIG. 2, the source code of an XML electronic signature according to the present invention includes elements, including <Signature>, <SignedInfo>, <CanonicalizationMethod>, <SignatureMethod>, (<Reference (URI=)?>, (<Transforms>)?, <DigestMethod>, <DigestValue>, </Reference>)+, </SignedInfo>, <SignatureValue>, (<KeyInfo>)?, (<Object>)*, and </Signature>. Here, '*' denotes zero or more occurrences, '+' denotes one or more occurrences, and '?' denotes zero or one occurrence.

Figure 3:
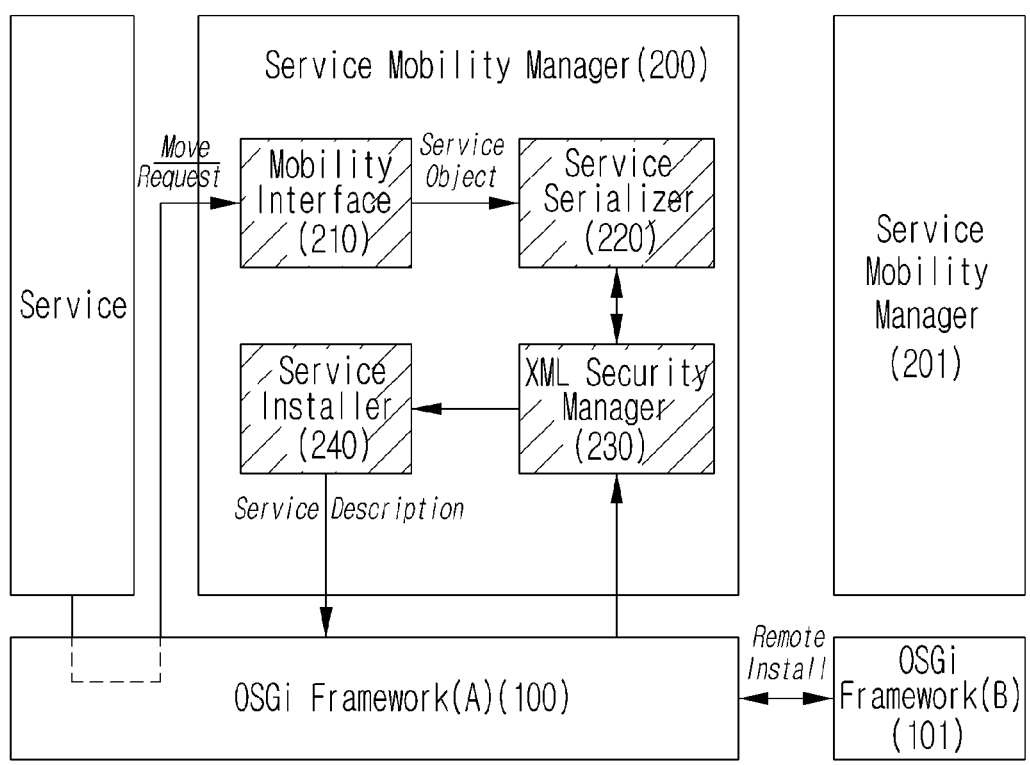
FIG. 3 is a block diagram showing the configuration of a system for managing service mobility using an XML electronic signature on an OSGi service platform according to the present invention.

FIG. 3 is a block diagram showing the configuration of a system for managing service mobility using an XML electronic signature on an OSGi service platform according to the present invention.

As shown in FIG. 3, a system for managing service mobility 200 using an XML electronic signature according to the present invention includes a mobility interface 210 for managing mobility, a service serializer 220 for processing serialization and deserialization, and an XML security manager 230 for processing an XML electronic signature, and a service installer 240 for transmitting a signed Java Achieve (JAR) file to an OSGi framework that has requested that a service be moved.

When the mobility interface 210 receives a request for the movement of a service "Move", the mobility interface 210 manages the lifecycle of the corresponding service, and thus the mobility interface 210 stops all operations related to the service being currently performed and stores a current service state.

Before the service is moved, the service serializer 220 serializes the service state information before the movement, and converts the service state information into an XML form capable of being attached to an electronic signature.

The XML security manager 230 creates an XML electronic signature for the Manifest file of the JAR file of a service bundle, attaches the serialized service state information to the XML electronic signature, and records it.

The service installer 240 transmits the signed JAR file to the OSGi framework that has requested that a service be moved.

When a service that must be moved is moved to another framework (B) 101, a user transmits a "Move" request to a service mobility manger. When the "Move" request is transmitted, an OSGi framework (A) 100 creates an XML electronic signature for the Manifest file of the JAR file of a service bundle, records service state information in the <Object> element of an electronic signature, and adds the electronic signature to the JAR file for remote installation.

Another OSGi framework (B) 101 receives the JAR file to which the XML electronic signature is added, verifies the JAR file using an algorithm specified in the XML electronic signature and public key information, and supports the service mobility.

Figure 4:
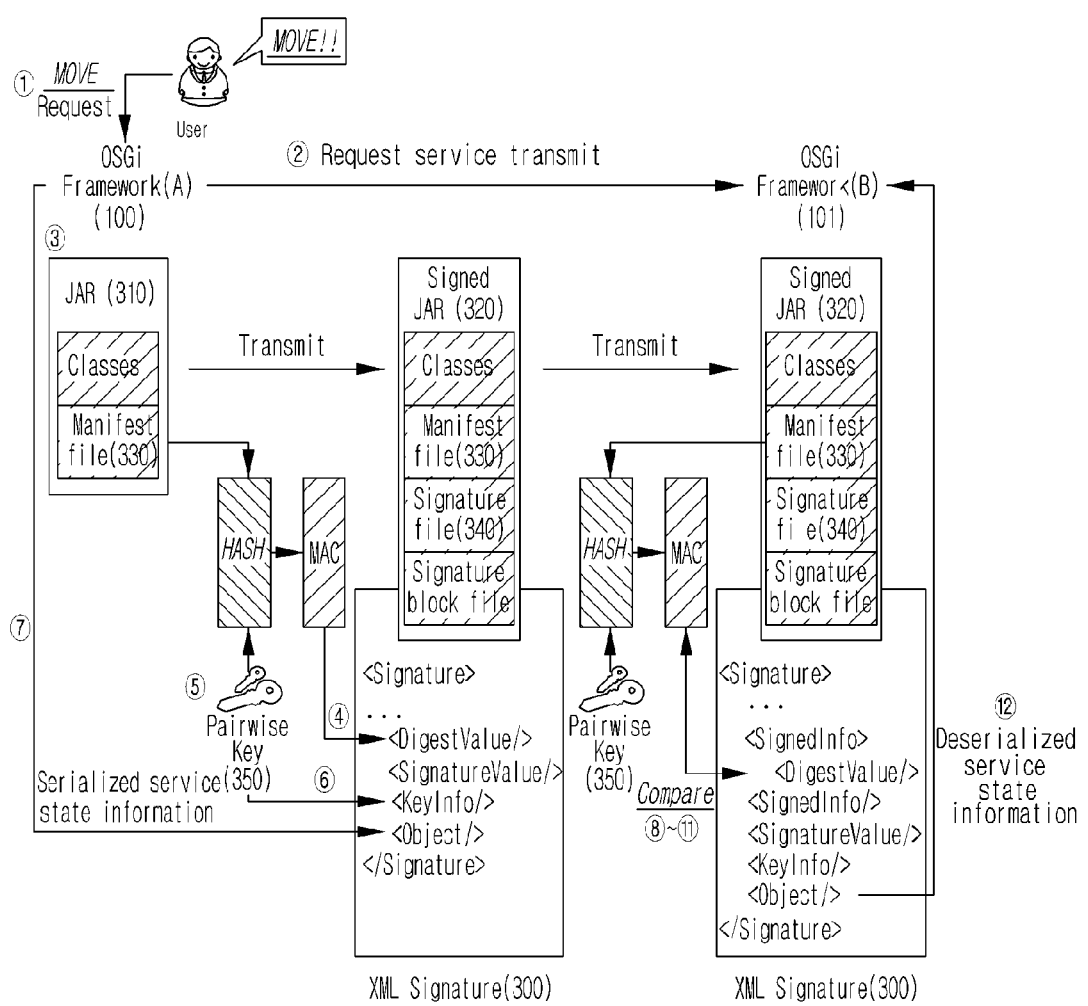
FIG. 4 is a flowchart showing service mobility and an authentication mechanism in the system for managing service mobility using an XML electronic signature on an OSGi service platform according to the present invention.

FIG. 4 is a flowchart showing a service mobility and authentication mechanism in the system for managing service mobility using an XML electronic signature on an OSGi service platform according to the present invention.

Referring to FIG. 4, a process of creating an XML electronic signature on the OSGi framework 100 for transmitting a service will be described in conjunction with processes A to F below.

A. A user requests the service mobility manager 200 of the OSGi framework 100 to perform the service movement 'MOVE'.

B. The service mobility manager 200 requests the service mobility manager 201 of another OSGi framework 101 to perform the service movement.

C. In order to create an electronic signature for a service to be moved, the location of a JAR file 310 is assigned. Here, an algorithm for decompressing the JAR file is assigned in the <Transform> element, and the Manifest file 330 of the JAR file 310 is assigned in the URI of the <Reference> element. Therefore, an electronic signature for the corresponding service is created.

D. The digest value of the Manifest file 330 is calculated and recorded in the <DigestValue> element. Here, the algorithm that is used is specified in the <DigestMethod> element.

E. An electronic signature is created using a shared key 350, and is recorded in the <SignedValue> element.

F. Information about the shared key is provided such that another OSGi framework 101 receives and authenticates a signed document. This information is recorded in the <KeyInfo> element.

G. The service state information is serialized and converted into a form that is attachable to the electronic signature. Here, preferably, the service state information is converted into an XML form, and the service state information, converted into the XML form, is recorded in the <Object> element.

Next, a process performed on the OSGi framework 101 that received the XML electronic signature will be described with reference to processes H to L below. The OSGi framework 101 that received the XML electronic signature verifies the electronic signature recorded in the <SignedInfo> element. Here, the verification is processed through two processes, that is, a process of verifying the <SignedInfo> element and a process of verifying the digest value of the <Reference> element, which is the child element of the <SignedInfo> element.

H. The digest value of the <SignedInfo> element is calculated using the algorithm specified in the <SignatureMethod> element.

I. The value of the XML electronic signature included in the <SignatureValue> element is decoded using a public key included in the <KeyInfo> element, and whether the value of an XML electronic signature is the same as the result value of the process H is determined.

J. The digest value of the Manifest, referred to by the <Reference> element, which is the child element of the <SignedInfo> element, is calculated.

K. Whether the result value of the process J is the same as the value of the <DigestValue> element is determined.

L. When authentication for a service bundle is completed, remote installation for the service bundle is performed, and the service state information, recorded in the <Object> element of the electronic signature, is parsed and deserialized, thereby completing the restoration of the service.

Figure 5:
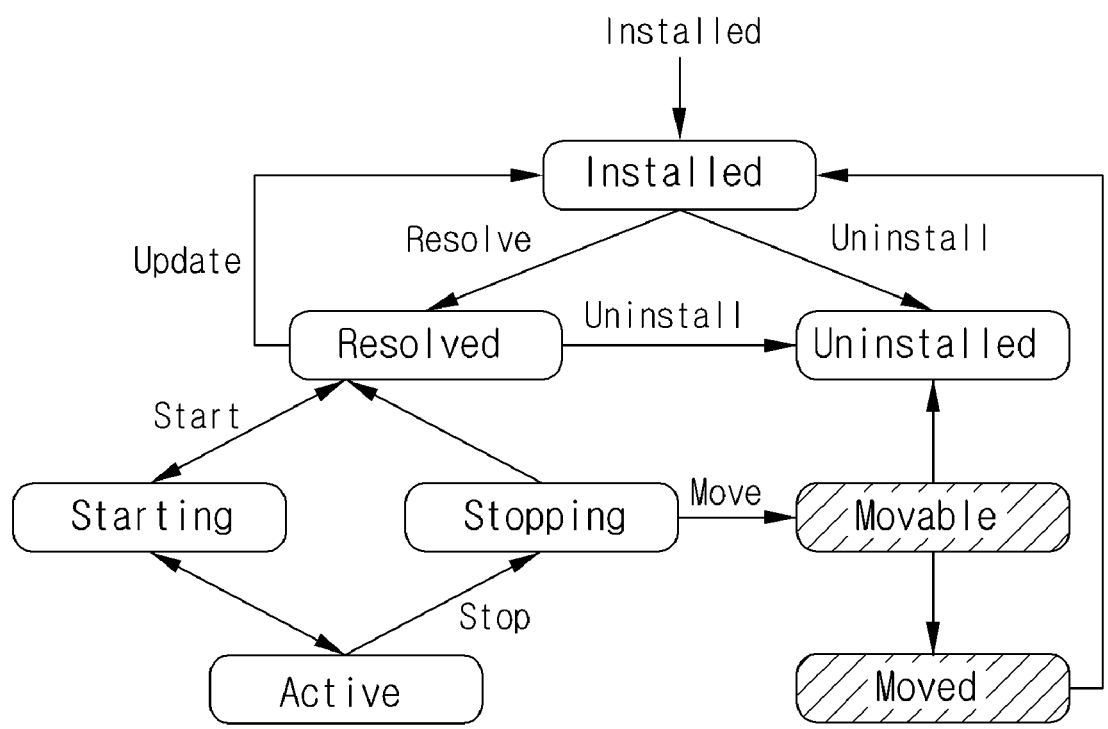
FIG. 5 is a flowchart showing the lifecycle of a service bundle in the system for managing service mobility using an XML electronic signature on an OSGi service platform according to the present invention.

FIG. 5 is a flowchart showing the lifecycle of the service bundle in the system for managing service mobility using an XML electronic signature on an OSGi service platform according to the present invention.

Referring to FIG. 5, the present invention defines a new lifecycle in order to support service mobility without affecting the existing lifecycle of a bundle that operates on an OSGi framework.

In the new lifecycle, in addition to the basic states of a bundle defined in the OSGi service platform, that is, "Installed", "Resolved", "Uninstalled", "Starting", "Active", and "Stopping" states, "Movable" and "Moved" states are added.

Before a service having mobility receives a "MOVE" request, the state of the service is automatically changed from a "Movable" state to a "Moved" state. The "Moved" state is a process of arranging data on the OSGi framework 100 that is performing the process of moving the service, and of performing an operation for moving the service to a new OSGi framework 101. After the "Moved" state is performed, the state of a bundle is changed to a "Uninstalled" state on the existing OSGi framework 100, and the state of the corresponding bundle is changed to an "Installed" state on the new OSGi framework 101 to which the service is moved.

FIGS. 6A and 6B is a view showing XML electronic signature source code which shows an example of transfer according to the service mobility of a music service in the system for managing service mobility using an XML electronic signature on an OSGi service platform according to the present invention.

Referring to FIGS. 6A and 6B, an example of XML electronic signature source code, creation of which has been completed by creating an XML electronic signature for the Manifest file of the JAR file of a music service and recording the service state information of the music service in an <Object> element, is shown.

The system for managing service mobility using an XML electronic signature and the method of managing the same according to the present invention, which has the above-described configuration, have advantages of solving the security problem of existing systems for managing service mobility, simplifying a related process and supporting service mobility in real time between service gateways having limited system resources, without performing additional operations or interworking with a certification authority, and transmitting a secured service bundle and service state information, thereby supporting secure and efficient service mobility.

Although the system for managing service mobility using an XML electronic signature and a method of managing the same according to the present invention have been described with reference to the exemplified drawings, the present invention is not limited to the disclosed embodiments and the drawings. Further, those skilled in the art will appreciate that various modifications, additions and substitutions are possible, without departing from the scope and spirit of the invention as disclosed in the accompanying claims.

What is claimed is:

1. A system for managing service mobility using an eXtensible Markup Language (XML) electronic signature, comprising:
    a mobility interface for stopping and storing an operation of a service being currently performed and moving the service upon receiving a service move request from an Open Service Gateway initiative (OSGi) framework when a user submits the service move request;
    a service serializer for, before the requested service is moved, serializing service state information and converting it into an XML form, which is attachable to an electronic signature;
    an XML security manager, using a processor, for creating an XML electronic signature for a Manifest file of a Java ARchive (JAR) file of a service bundle, attaching the serialized service state information to an object element of the XML electronic signature, wherein the XML electronic signature is created to record security information of the service bundle and the service state without interworking with a certification authority; and
    a service installer for transmitting the signed JAR file with the XML electronic signature to said OSGi framework that subsequently installs the requested service and sets service state information to support the service mobility management.

2. The system for managing service mobility as set forth in claim 1, wherein, when the mobility interface receives a service move request, the mobility interface manages a lifecycle of the corresponding service, so that the mobility interface stops all operation related to the service being currently performed and stores a current service state.

3. The system for managing service mobility as set forth in claim 1, wherein source code of the XML electronic signature comprises elements, including <Signature>, <SignedInfo>, <CanonicalizationMethod>, <SignatureMethod>, (<Reference (URI=)?>, (<Transforms>)?, <DigestMethod>, <DigestValue>, </Reference>)+, </SignedInfo>, <SignatureValue>, (<KeyInfo>)?, (<Object>)*, and </Signature>, where '*' denotes zero or more occurrences, '+' denotes one or more occurrences, and '?' denotes zero or one occurrence.

4. The system for managing service mobility as set forth in claim 1, wherein the XML security manager creates an XML electronic signature for the Manifest file of the JAR file of the service bundle, and records the serialized service state information in an <Object> element of the XML electronic signature.

5. The system for managing service mobility as set forth in claim 1, further comprising:
    an OSGi framework for receiving the signed JAR file and verifying the signed JAR file using an algorithm and public key information which are specified in the XML electronic signature.

6. A method of managing service mobility using an XML electronic signature, comprising:
    configuring a processor to perform the steps of operations;
    stopping an operation of a service being currently performed, storing it in a mobility interface and moving the service upon receiving a service move request from an Open Service Gateway initiative (OSGi) framework when a user submits the service move request;
    before the service is moved, serializing service state information and converting it into an XML form, which is attachable to an electronic signature;
    creating an XML electronic signature for a Manifest file of a Java ARchive (JAR) file of a service bundle, attaching the serialized service state information to an object element of the XML electronic signature, wherein the XML electronic signature is created to record security information of the service bundle and the service state without interworking with a certification authority; and
    transmitting the signed JAR file with the XML electronic signature to said OSGi framework that subsequently installs the requested service and sets service state information to support the service mobility management.

7. The method of managing service mobility as set forth in claim 6, wherein the serialized service state information is recorded in an <Object> element of the XML electronic signature.

8. The method of managing service mobility as set forth in claim 6, further comprising:
    receiving the signed JAR file, and verifying the signed JAR file using an algorithm and public key information which are specified in the XML electronic signature.

* * * * *